July 8, 1958

G. T. W. HALL 2,841,885

RADAR TRAINER

Filed May 13, 1954

2 Sheets-Sheet 1

Inventor
G. T. W. HALL
By Philip M. Bolton
Attorney

July 8, 1958  G. T. W. HALL  2,841,885
RADAR TRAINER

Filed May 13, 1954  2 Sheets-Sheet 2

Inventor
G. T. W. HALL
By Philip M. Bolton
Attorney

United States Patent Office 2,841,885
Patented July 8, 1958

2,841,885

RADAR TRAINER

George Thomas William Hall, London, England, assignor to International Standard Electric Corporation, New York, N. Y., a corporation of Delaware Application May 13, 1954, Serial No. 429,625

Claims priority, application Great Britain May 15, 1953

6 Claims. (Cl. 35—10.4)

This invention relates to devices of the type commonly referred to as "radar trainers," in which a simulated radar display is provided as an aid to the instruction of radar observers.

It is an object of this invention to provide a radar training device of simple construction and low cost.

According to the present invention there is provided a radar-observation training device comprising a translucent viewing screen, means for producing an elongated beam of ultra-violet light in simulation of an oscillograph time-base trace, means for causing said beam to scan said screen in accordance with the scanning function of a given type of radar search equipment, at least one translucent target-image carrier located adjacent said screen to intercept the field of said scanning beam and having marked, or carried thereon at least one spot of fluorescent material of relatively high persistence serving to simulate the radar image of a mobile target to be observed, and means for moving said carrier in at least one direction substantially parallel to said screen to simulate the effect of movement of said target.

Figure 1:
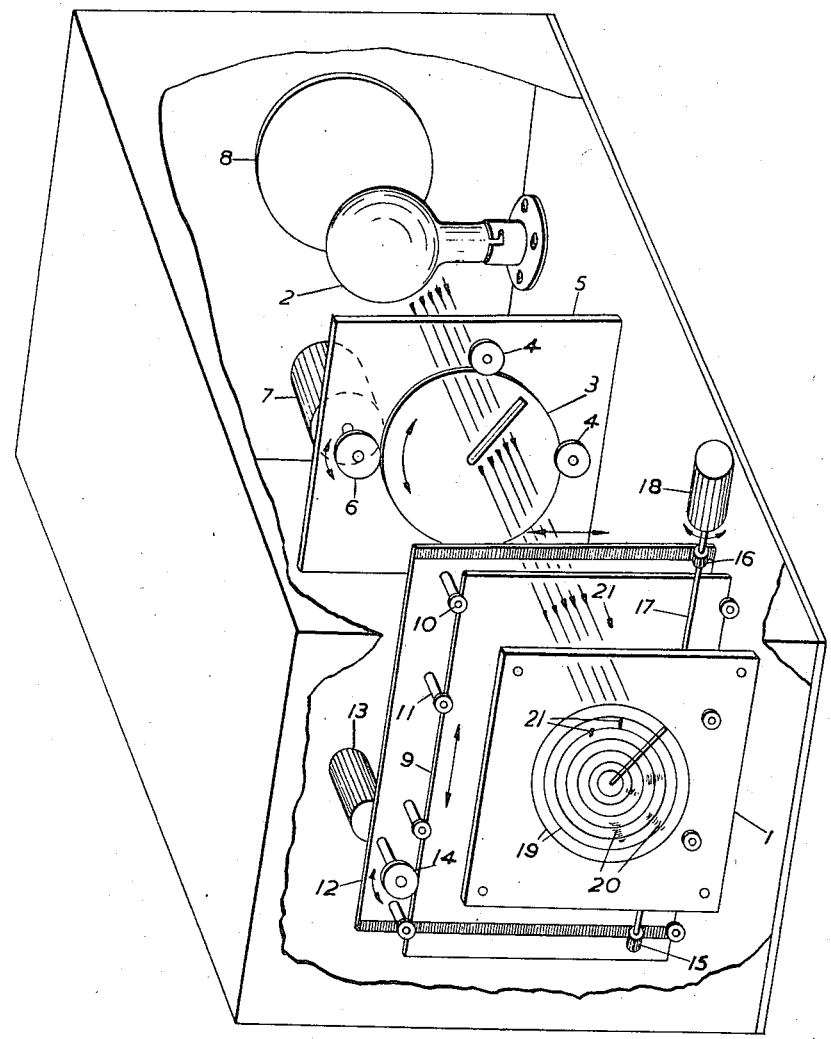

The invention will be better understood from the following description, taken in conjunction with the accompanying drawings, in which:

Fig. 1 illustrates an embodiment of the invention, adapted to simulate P. P. I. presentation, particularly of radar targets which move in fixed formation.

Figure 2:
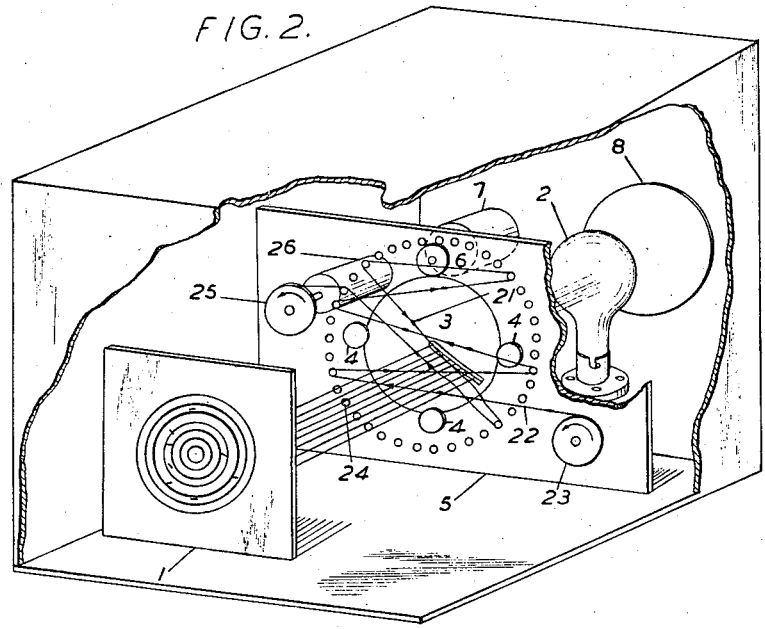

Fig. 2 illustrates another embodiment of the invention, adapted to simulate P. P. I. presentation, particularly of radar targets which move on independent courses.

Figure 3:
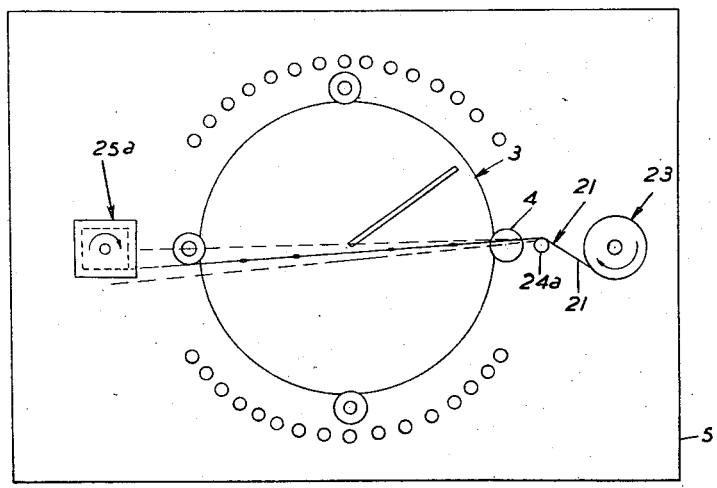

Fig. 3 illustrates a modification of the embodiment illustrated in Fig. 2, adapted to simulate presentation of a "weaving" course.

For the sake of clarity the drawings have been simplified by the omission of mounting and other details not essential to an understanding of the invention. The same part is designated by the same reference numeral in each of the several figures.

Referring now to Fig. 1 of the drawings, 1 is a fixed clear plastic or glass viewing screen which has been sprayed or otherwise coated with anthracene in colourless lacquer. This screen so treated, will glow with relatively low persistence under the influence of ultra-violet light from light source 2.

Drawn on this screen with a suspension of cadmium-sulphide in colourless lacquer is a calibration scale comprising a number of concentric rings, such as shown at 19, representing units of range in yards to any convenient scale, the centre of the circles representing the radar position. Markings of the same high persistence material are also painted on the screen as shown at 20 to represent "Clutter" or echoes from static objects or coast line and coastal areas or even mutual interference from other equipments, or pulse jamming. Such rings and patches will be illuminated under the influence of ultra-violet light from light source 2, due to the afterglow properties of cadmium-sulphide they will continue to glow with relatively high persistence after the ultra-violet light has been blocked off from the screen.

Between screen 1, and light source 2, an opaque disc 3, with a gear-cut outer periphery, is located on a panel 5, and supported by guide rollers 4, and driven by pinion 6 mounted on the drive shaft of the variable speed electric motor 7. The panel 5 on which the disc 3 is mounted is made sufficiently large to shield the viewing screen 1 from stray illumination from lamp 2, but has a hole cut in its face of sufficient diameter to just clear the disc, its centre coincident with the axis of rotation of disc 3 and the disc is slotted from its centre to a point almost on the outer periphery. It will readily be understood that ultra-violet light concentrated by reflector 8 will only be admitted to screen 1 through this slot in the form of an elongated beam directed as shown by the arrows and that the anthracene and colourless lacquer coating will glow only as long as this band of ultra-violet light is projected onto it.

If disc 3 is continuously rotated a simulated time-base will appear on screen 1, apparently extending from the centre to the outer range marker ring and sweeping continuously round the screen face in a manner similar to a conventional position plan-indicator display. Since the anthracene and colourless lacquer solution is largely devoid of afterglow properties, there will be little persistence of this time-base on any one part of the screen during rotation of the disc. Range marker rings 19, "clutter" patterns 20 etc. painted with cadmium-sulphide and colourless lacquer will be illuminated by ultra-violet light from light source 2, and continue to glow for some time during a complete 360° sweep of the time-base. Thus a static picture of the area with range markers is presented in a natural manner.

Consider now the problem of presentation of moving and reflecting objects such as ships or aircraft on definite courses or changing courses, at a definite or a changing rate. This is accomplished in the embodiment of Fig. 1 by a target-image carrier comprising a further clear screen or echo plate 9, on which target-image "blips" are painted as shown for example at 21, with a cadmium-sulphide and colourless lacquer suspension, such a suspension having afterglow properties of relatively high persistence. The plate 9 is carried between a number of rollers, 10, mounted on spindles 11, fixed to another clear plastic screen 12, and may be given an up or down movement with regard to the centre of the tube, by variable speed motor 13, driving the screen through friction wheel 14.

Similarly a left or right movement may be given to the "blips" or target-images by driving the clear screen 12, through pinions 15 and 16, on a shaft 17, by variable speed motor 18, these pinions engaging with racks fitted to each end of the screen, as shown.

The horizontal and vertical speeds of the "blip" or "blips" 21 may be controlled by varying the speeds of motors 13 and 18, and driving them in plus or minus direction as required. Control of variation of speed and reversal of direction may be exercised through a variable resistance across the motor brushes and a reversal switch housed in the Instructor's control box (not shown). A dial calibrated in yards per second may be fitted to the variable resistance shafts and set against a fixed cursor. In this manner a "blip" or "blips" may be caused to move on any course at only desired apparent speed. Such a "blip" or "blips" is illuminated and seen through the viewing screen with a period of after-glow, immediately when the simulated time-base of ultra-violet light passes over the "blip" or "blips."

In the embodiment described above with reference to Fig. 1 it will be apparent that when the echo plate 9 carries a plurality of target images or "blips," the movement of the echo plate will result in movement of all the target-images in unison, the display simulating the manoeuvring of a fleet in which all craft keep in station and change course simultaneously by the same amount.

Several transparent screens 9 may, however, be arranged between the disc 3 and screen 1, each marked with blips 21 and may be independently driven so as to simulate targets moving in different directions. The preferred embodiment to permit the representation of a number of targets which move in different directions is illustrated in Fig. 2. In this embodiment the target images are marked or carried not on a sheet but on a continuous thread which may cross and re-cross the field of the scanning beam a number of times in different directions.

Referring to Fig. 2, the apparatus illustrated therein is identical to that shown in Fig. 1 in respect of the viewing screen and the means for producing a scanning beam of ultra-violet light. The translucent plate target-image carrier and its drive of Fig. 1 are replaced by an arrangement comprising a thread 22, of translucent plastic material such as nylon, and of diameter approximately .002 inch, marked with spots of high-persistence fluorescent material at various points along its length, as for example as indicated at 21, which thread is drawn off from a storage bobbin 23 on to a wind-on bobbin 25 driven by any suitable motor means 26. Bobbins 23 and 25 are mounted on opaque plate 5 on the side remote from the ultra-violet lamp 2, and the thread is guided in its passage from one bobbin to another by at least one free-running V-grooved guide pulley such as 24 so located relative to the storage and draw-off bobbins that the thread traverses the field of the scanning beam more than once, whereby any particular spot appears as crossing the viewing screen first in one direction and then in another. In the present instance a plurality of such guide pulleys 24 is provided mounted on opaque sheet 5 at approximately equal intervals round the circumference of a circle concentric with the slotted disc 3. The pulleys located in one pair of opposing quadrants have their grooves slightly displaced axially relative to the grooves of the pulleys in the other pair of opposing quadrants by a small amount, approximately ⅛ inch, so as to permit the thread to travel freely along crossing courses. By selection of the number and position of guiding pulleys to be used, the thread may be made to travel in succession over a great variety of courses, and if target spots are marked on the thread at suitable intervals the display will resemble that corresponding to a plurality of targets moving independently instead of in unison. In Fig. 2 the thread is shown as guided by seven pulleys, so that it traverses six courses all within the field of the scanning beam and differently directed as shown by the arrow-heads.

If desired, the pulleys may be mounted for rotation as a group round the scanning axis, whereby the course(s) may be changed through a continuous range of azimuth angle.

While in Fig. 2 the target-carrier driving arrangement is shown as having its details mounted on the shielding plate 5, it is to be understood that if desired the arrangement may be mounted on a separate mounting plate located between the viewing screen and plate 5, this separate plate being apertured or otherwise adapted to pass the field of the scanning beam.

The arrangement just described with reference to Fig. 2 is adapted to give a display simulating the movement of targets in different directions at the same speed. If it is desired to have a display simulating the movements of targets at different speeds this can readily be obtained, even with a single mounting plate, by adding additional spotted threads each having its own storage bobbin, draw-off bobbin, and guide pulleys. In such cases the various draw-off bobbins may have individual motors to give independently controllable speeds; or the draw-off bobbins may be made of different dimensions and driven by the same motor. The guide pulleys for the different threads should of course be axially spaced out from the mounting plate by such distances as are necessary to ensure that the threads do not mutually interfere.

While in the present case the thread which carries the spots of fluorescent material is made of nylon, it is to be understood that any other material may be used which is mechanically satisfactory and sufficiently translucent to avoid its being shown as a shadow on the viewing screen. Preferably the thread material should be of some plastic material, as it can then be chosen sufficiently large in diameter to carry easily a relatively large amount of fluorescent material per spot, while still retaining such a degree of translucency that no trace of the thread is distinguishable on the viewing screen. If the marking or spotting material is so strongly fluorescent that only a very small quantity per spot is required, the thread may then take the form of a metal wire of such small diameter that it may be considered translucent in the sense that its shadow is not plainly discernible on the viewing screen. When only a short thread is required, glass fibre may be used if desired.

Fig. 3 illustrates a simple modification of the target-image carrier arrangement of Fig. 2 which enables simulation of the display which would be given by a target following a "weaving" course. In this modification the draw-off bobbin 25a, instead of having a winding mandrel of the usual circular cross section, has a winding mandrel of rectangular cross section. As the thread is drawn off by rotation of bobbin 25a the length of wire between the bobbin and the guiding pulley 24a oscillates in a plane substantially parallel to the viewing screen, the amplitude of oscillation increasing from zero at the pulley to a maximum at the bobbin. Thus if any particular spot on the thread is watched as it traverses the scanning field it will be observed to "weave" about the mean course, the amount of weaving depending on the rotation speed of bobbin a and the eccentricity resulting from the rectangular shape of the winding mandrel. As an alternative to using a bobbin with a rectangular mandrel, the usual circular mandrel may be employed, with the bobbin mounted for rotation about an eccentric axis. In either case, if the amplitude of oscillation of the thread is large near the bobbin it may be necessary to omit some of the guide pulleys shown in Fig. 2 in order to give full liberty to the thread to oscillate about a point on the distant guide pulley 24a.

While in Fig. 3 the thread has been shown for the sake of clearness as traversing the scanning area only once, it is to be understood that if desired the thread may be looped backward and forward in the manner indicated in Fig. 2, in which case the display on the screen will show a number of targets following different courses, one of these courses being of the weaving type.

It is also to be observed that in Figs. 1 and 2 the target-image carrier arrangements have for the sake of clearness been shown as spaced somewhat back from the viewing screen. In the actual construction, however, the target image carrier arrangement should preferably be located close to the viewing screen so that parallax error may be kept at a low level when the calibration scales are used.

If it is desired to simulate the display given by one group of craft manoeuvring in fixed formation and another group of craft each of which is manoeuvring independently, this may be done by inserting in the filed of the scanning beam two target-image carrier arrangements one behind the other, one being of the translucent plate illustrated in Fig. 1, and the other of the thread type illustrated in Fig. 2.

If it is desired to give a simulation of azimuth sector scan or elevation sector scan, the appropriate markings are applied to the viewing screen, and the slot in the opaque disc 3 instead of being rotated continuously is made to oscillate about its centre over a sector corresponding to the azimuth or elevation scan, the motion being imparted by any suitable reciprocating mechanism. Changes of indicated course or speed are accomplished, in a manner similar to that already described, by controlling the speed(s) of the motor(s) moving the target-image carrier.

It will be apparent that the training device herein described furnishes means for training radio operators in the observation and interpretation of cathode ray tube presentations as applied to radar, where courses and speeds of moving radar targets are infinitely variable. The device is particularly suitable for training in the use of air-surveillance-radar, precision-approach radar, and other forms of ground-control approach radar systems. If desired, the effects of interference and radar jamming may also be simulated by means of auxiliary target-image carrier arrangements, having suitable markings, traversed at suitable speeds in the field of the scanning beam.

While the principles of the invention have been described above in connection with specific apparatus, it is to be clearly understood that this description is made only by way of example and not as a limitation on the scope of the invention.

What I claim is:

1. A radar-observation training device comprising a translucent viewing screen, means for producing an elongated beam of ultra-violet light in simulation of an oscillograph time-base trace, means for causing said beam to scan said screen in accordance with the scanning function of a given type of radar search equiment, at least one translucent target-image carrier located adjacent said screen comprising a translucent thread, a storage bobbin for said thread, at least one spot of fluorescent material on said thread of relatively high persistence to simulate the radar image of a mobile target to be observed, and a draw-off device adapted for drawing said thread from said bobbin over a path to intercept the field of said scanning beam.

2. A device according to claim 1 in which said thread is formed of a translucent plastic material.

3. A device according to claim 1, further comprising at least one free-running guide pulley for said thread, said pulley being so located relative to said storage bobbin and said draw-off device that said thread traverses the field of said scanning beam more than once, in the course of its passage from said storage bobbin.

4. A device according to claim 1, in which said draw-off device is adapted to impart to said thread an oscillatory motion in a plane substantially parallel to said screen.

5. A device according to claim 4, in which said draw-off device comprises a rotatable wind-on bobbin having a winding cross section of shape other than circular.

6. A device according to claim 4, in which said draw-off device comprises a wind-on bobbin mounted for rotation about an eccentric axis.

References Cited in the file of this patent

UNITED STATES PATENTS

| | | |
|---|---|---|
| 2,443,631 | McDermott et al. | June 22, 1948 |
| 2,505,094 | Bunyan | Apr. 25, 1950 |
| 2,505,793 | Rust et al. | May 2, 1950 |
| 2,618,867 | Coppens | Nov. 25, 1952 |
| 2,633,648 | Amman | Apr. 7, 1953 |